United States Patent [19]

Seigert

[11] 4,325,587

[45] Apr. 20, 1982

[54] PROTECTIVE DEVICE FOR UNIVERSAL JOINTS

[75] Inventor: Peter Seigert, Lohmar, Fed. Rep. of Germany

[73] Assignee: Jean Walterscheid GmbH, Lohmar, Fed. Rep. of Germany

[21] Appl. No.: 133,986

[22] Filed: Mar. 26, 1980

[30] Foreign Application Priority Data

Mar. 31, 1979 [DE] Fed. Rep. of Germany ....... 2912939

[51] Int. Cl.³ .......................... F16C 1/06; F16D 3/84
[52] U.S. Cl. ...................................... 308/36.1; 64/21; 64/32 F; 277/212 FB
[58] Field of Search ............ 64/32 F, 21; 277/237 A, 277/88, 212 FB; 308/36.1, 37, 58

[56] References Cited

U.S. PATENT DOCUMENTS 2,255,172  9/1941  Johnson ............................... 64/32 F
3,795,118  3/1974  Kesl et al. ............................ 64/32 F Primary Examiner—Frederick R. Schmidt
Attorney, Agent, or Firm—Toren, McGeady & Stanger

[57] ABSTRACT

A protective device for a universal joint particularly for use in agricultural implements is formed of a hollow protective member having a generally frustoconical configuration and consisting essentially of resilient material surrounding the universal joint, with an annular support member being fixedly connected to the interior of the hollow protective member approximately in the region of the bending center of the universal joint and with a bearing ring being concentrically mounted within the support member and arranged to be rotatable relative thereto.

7 Claims, 4 Drawing Figures

PROTECTIVE DEVICE FOR UNIVERSAL JOINTS

The present invention relates generally to universal joints particularly useful in argricultural implements and more specifically to a protective device for such universal joints. The type of protective device to which the invention relates consists of a protective frustoconical member of elastic material which is supported to extend about the universal joint on a shaft end of the yoke thereof.

A so-called wide-angle universal joint which consists of a double universal joint and within which an inner member of a two-piece contact protection device is supported on the outer circumference of a double flange of the double joint is known from German Offenlegungsschrift No. 2 046 236. In such a device, in order to facilitate assembly of the bearing within one of the parts of the protective contact device, two axially separate halves are assembled by means of pins and cooperating holes. The other member of the protective contact device is supported on the hub of the yoke of the joint and serves the purpose of enclosing with play the inner contact protection device to cover the latter at each possible bending angle.

A protective contact arrangement of this type is found to be too complicated and expensive for use in agricultural equipment. Furthermore, the two halves of the protective device must be made of a relatively rigid material in order to insure sufficient safety. Since during practical application of the device, strong impacts acting upon the protective contact device cannot be avoided, for example when the universal joint shaft is dropped to the ground during uncoupling of an agricultural implement, deformation in at least the outer half of the protective device must be expected. In such a case, however, accurate engagement of the parts will tend to be impaired and there will no longer be any assurance that the two halves of the protective device will interact without play. Thus, it is usually expected that the contact protective device will frequently require replacement. As a result, operation of the universal joint equipped with such a protective device tends to become more expensive.

A further disadvantage of the type of device described above resides in the fact that, when it is required for the joint to be tilted or bent by angle of 90° while the universal joint shaft remains stationary, it is found that this cannot be accomplished without destroying the protective device itself. However, such action must be expected since a tractor with an attached implement must frequently be turned within a very small area.

For the reasons mentioned above, there exists a requirement for a protective device which is elastic in its operation, will not be damaged by hard impact and which will assume its original shape after a load thereon has been removed. Furthermore, such a protective device should be capable of elastic deformation to a sufficient degree to prevent damage when the universal joint shaft is bent through an angle of up to 90°.

Moreover, it has been suggested that the sealing boot should be strengthened by inserting therein spreading, internal reinforcements in the region of the outer folds of the boot. Such reinforcements are formed, for example, by steel wire as indicated in German Offenlegungsschrift No. 2 255 070. This measure does not contribute to increase in the stability of the sealing boot and it cannot meet the requirements which arise in connection with agricultural implements with respect to accident prevention.

During operation of an agricultural implement connected with a tractor, or when coupling or uncoupling the elements thereof, it frequently occurs that one end of the universal joint shaft will remain connected to the power take off shaft of the tractor with the other end being placed on the ground. In this case, operating personnel may step upon the protective device which is placed upon the ground while the power shaft is accidentally switched in the drive condition.

Furthermore, the danger of accidents will arise by virtue of the fact that the driver of a tractor, when mounting and dismounting the tractor, may step onto the stationary protective cone or device while the universal joint shaft is coupled on both sides and is rotating. Since sometimes it cannot be discerned that the rotating joint will cause injury, further risks of accidents will arise.

Additionally, because of the very limited free space existing between a tractor and an agricultural implement connected thereto, it is difficult to avoid contact between the protective cone and another component of the universal joint. Such contact will cause the protective cone to be pressed onto the rotating joint thereby causing the joint to act as a milling cutter. In all such cases, the protective cone will be destroyed within a relatively short time and it will no longer be capable of accomplishing the task of serving as a protective contact device for the joint.

Thus, the present invvention is directed toward provision of a resilient protective cone for a universal joint which will avoid the disadvantages discussed above which arise with rigid designs of protective contact devices. The invention is directed toward a protective cone which is capable of withstanding loads which act upon it in the radial direction without being destroyed when contact is made with the rotating parts of the universal joint. At the same time, advantages of resilient protective cones are retained by the present invention, such as return of the protective cone to its original shape after a load has been applied thereto and when extreme bending angles up to 90° of the universal joint have occurred.

SUMMARY OF THE INVENTION

Briefly, the present invention may be described as a protective device for universal joints particularly suitable for agricultural implements comprising a hollow protective member having a generally frustoconical configuration and consisting essentially of resilient material, said protective member being arranged to surround the universal joint, an annular support member fixedly connected to the interior of the hollow protective member approximately in the region of the bending center of the universal joint, and a bearing ring concentrically mounted within the support member and arranged to be rotatable relative thereto.

In a structure in accordance with the present invention, it is particularly advantageous that the round shape of the protective cone be maintained by the support ring in the region of the bending center of the joint. This, therefore, insures that the bearing ring arranged within the support ring will be freely rotatable when the protective cone bears against a rotating portion of the universal joint due to an external load. In such a case, the bearing ring will rotate together with the joint and prevent the protective cone from being ruptured thereby avoiding destruction resulting from undue heating.

In a further development of the invention, a plurality of radially outwardly directed webs are arranged about the outer circumference of the support ring.

By arranging webs on the outer circumference of the support ring, it may be reliably insured in an advantageous manner that the support ring cannot rotate even when friction between the support ring and the bearing ring is increased because of dirt or other contaminating materials which have penetrated therebetween. Since the support ring is advantageously inserted when the protective cone is warm and the protective cone subsequently contracts, a polygonal shape extending over the ends of the webs will be formed and the protective cone will assume the shape of a polygon around the support ring. This increases the grip thereof in the circumferential direction.

Furthermore, for example, when the protective cone rests upon the ground or when the protective cone makes contact with another member, a quasi-frictional engagement will occur which makes it more difficult for the protective cone to rotate with the universal joint shaft.

According to a further feature of the invention, a radially inwardly protruding circumferential projection is provided at the inner circumference of the support ring and the bearing ring is externally provided with a corresponding annular groove. The bearing ring may be elastically deformed to such an extent that the outer circumference of the bearing ring may be guided through the inner circumference of the projection.

In cooperation with the outer annular groove of the bearing ring, the circumferential projection provided on the inner circumference of the support ring will insure that the bearing ring is secured against axial movement in the support ring. Since the bearing ring is not required to assume a support function, it may be formed of material sufficiently elastic that it may be easily passed through the inner circumference of the projection. By establishing the appropriate tolerances and sufficient play, easy assembly of the bearing ring will be further facilitated.

In a further embodiment of the invention, the radially inwardly protruding projection may be formed in a discontinuous manner. As a result, the protruding projections on the support ring will become deformable thereby, in turn, facilitating easier assembly of the device.

In another advantageous embodiment of the invention, the bearing ring may be formed at its inner diameter with a convex cross-sectional configuration at least in the middle portion thereof. The convex design of the inner side of the bearing ring will result in directing, toward the center of the bearing, forces which act on the bearing ring upon contact thereof with the joint.

In a protective device having a corrugated protective cone, the support ring may be advantageously held in an outwardly curving section of the protective cone. As a result of this measure, the support ring may be affixed to a corrugated protective funnel in the simplest manner.

According to a further feature of the invention, the support ring will be arranged to engage with at least a portion of its radially outwardly directed webs in recesses of the protective cone. In the case where frequently used smooth protective cones are involved, the support ring may be secured against axial movement in a relatively simple manner by the approach mentioned above.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
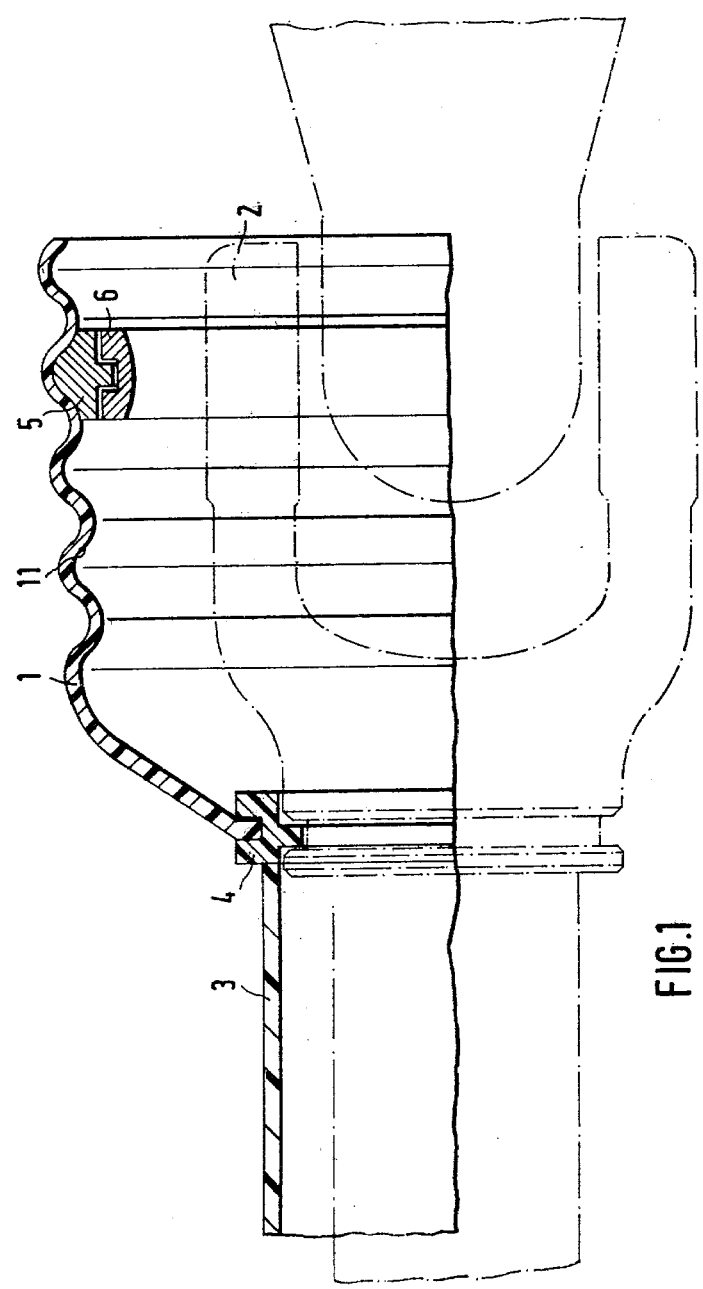
FIG. 1 is a schematic sectional view taken through an end of a universal joint shaft having a universal joint mounted on the end thereof, with a corrugated protective cone including an inserted support ring and bearing.

Referring now to the drawings, a universal joint assembly 2 is illustrated in FIG. 1 partially shown in broken line form wherein a protective tube 3 is arranged on the joint shaft through a bearing device 4. Fastened on the protective tube 3 is a corrugated protective cone 1. The protective tube 3 and the protective cone 1 are fixed by means of a chain (not shown) since they may not rotate for reasons of safety.

A support ring 5 is mounted in an outwardly curving section 11 of the protective cone 1 and a bearing ring 6 is arranged within the interior of the support ring 5.

Figure 2:
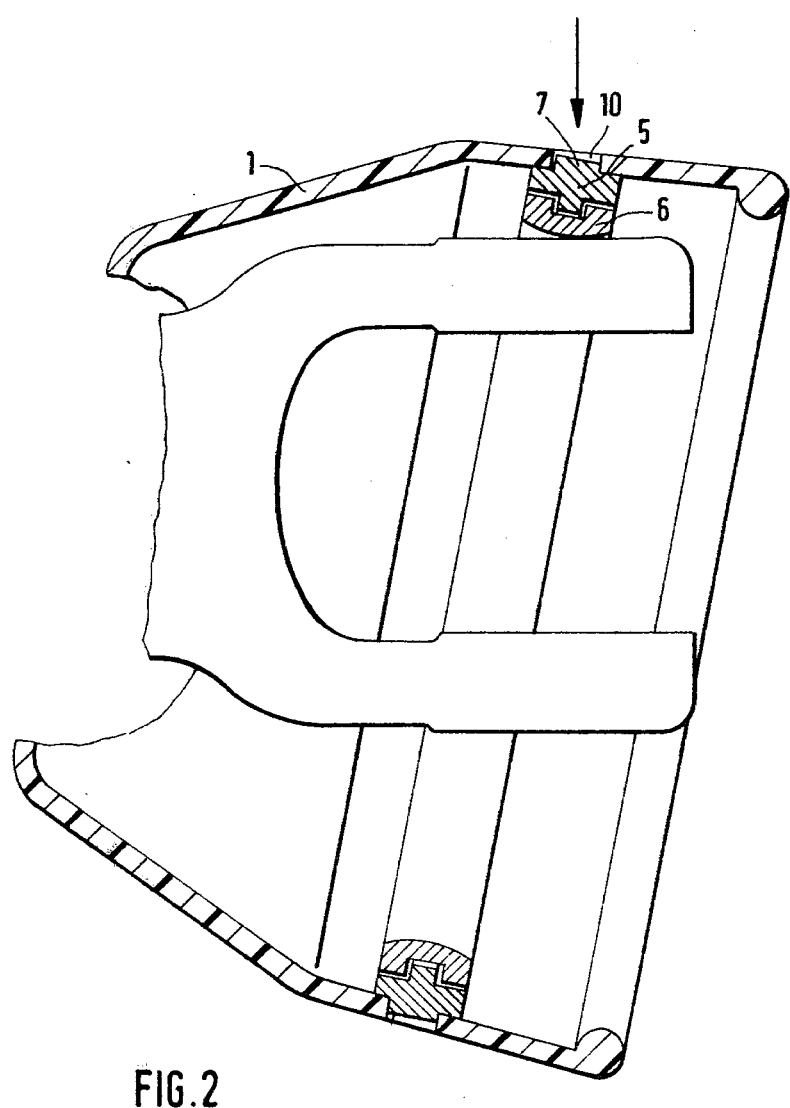
FIG. 2 is a sectional view showing the assembly of the support ring in a smooth protective cone showing the situation during loading of the protective device.

In FIG. 2 an elastic protective cone 1 is illustrated wherein the support ring 5 engages with a portion of its webs 7 in a recess 10 provided in the protective cone 1 and in this manner it is axially secured therein (lower half of FIG. 2).

In the upper half of FIG. 2 there is illustrated the case in which the protective cone 1 is unilaterally loaded. The load is indicated by the arrow shown in FIG. 2 and the bearing ring 6 will thereby bear against the yokes and will be rotated as a result. The relatively rigid support ring 5 insures that the necessary roundness of the entire bearing unit is maintained.

Figure 3:
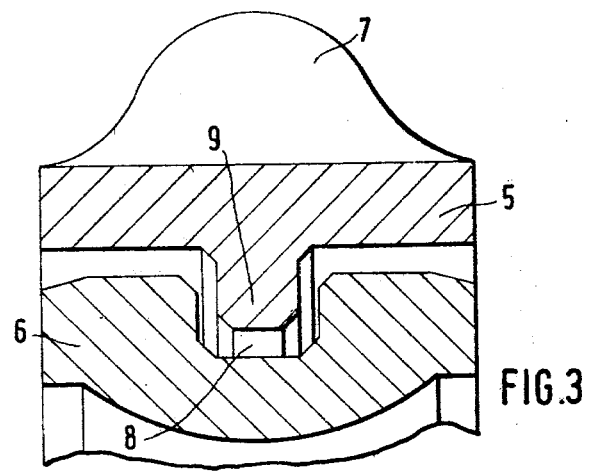
FIG. 3 is a sectional view taken through a support ring and a bearing ring of the invention.

In a section taken through the bearing illustrated in FIG. 3 the support ring 5 is provided at its outer circumference with webs 7. In order to effectively affix the bearing ring 6 in the support ring 5, the ring 5 is provided with a radially inwardly directed projection 9 which cooperates with an angular groove 8 provided in the bearing ring 6.

The cross section of the bearing ring 6 has a convex configuration extending toward the interior thereof so that support or reactive forces resulting from a load applied to the protective device will extend essentially through the center of the bearing.

Figure 4:
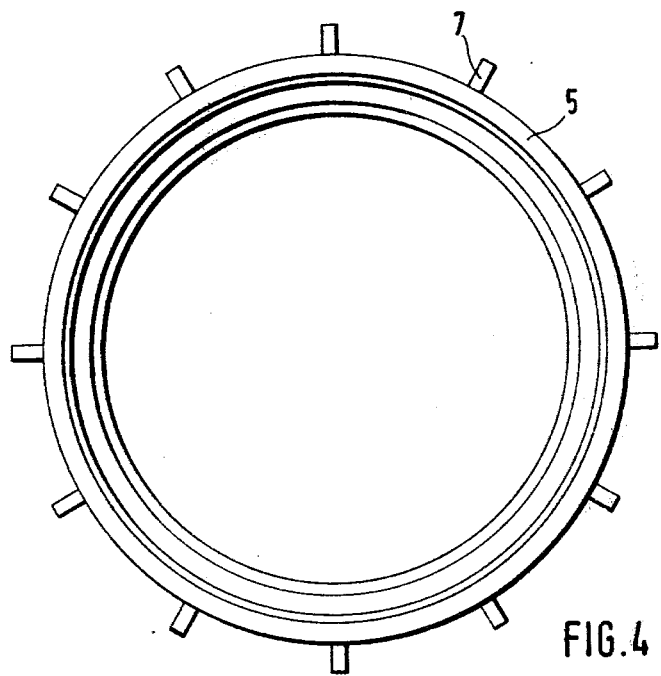
FIG. 4 is a side view of a support ring showing webs arranged on the outer circumference thereof.

In FIG. 4 there is shown a side view of a support ring having webs 7 arranged on its outer circumference, the webs 7 serving to improve the attachment of the support ring against rotation within the protective cone 1.

While specific embodiments of the invention have been shown and described in detail to illustrate the application of the inventive principles, it will be understood that the invention may be embodied otherwise without departing from such principles.

What is claimed is:

1. A protective device for a universal joint particularly for agricultural implements comprising: a hollow protective member having a generally frusto-conical configuration and consisting essentially of resilient material, said protective member being supported to surround said universal joint; an annular support member fixedly connected to the interior of said hollow protective member approximately in the region of the bending center of said universal joint; and a bearing ring concentrically mounted within said support member and arranged to be rotatable relative thereto; said bearing ring being normally spaced from said universal joint and located to abut against parts of said universal joint upon axial deflection of said joint thereby to support said protective member against said joint parts while enabling relative rotative movement between said protective member and said joint parts.

2. A protective device according to claim 1 wherein said support member is formed with a plurality of radially outwardly directed webs arranged on the outer circumference thereof.

3. A protective device according to claim 2 wherein said support member engages with at least a portion of said outwardly directed webs in recesses formed in said protective member.

4. A protective device according to claim 1 wherein said support member includes radially inwardly protruding circumferential projection means provided on the inner circumference thereof, wherein said bearing ring includes corresponding annular groove means provided on the outside thereof and wherein said bearing ring is elastically deformable to such an extent that the outer circumference of said bearing ring may be passed through the inner circumference of said projection means.

5. A protective device according to claim 4 wherein said radially inwardly protruding projection means is formed discontinuously along said inner circumference of said support member.

6. A protective device according to claim 1 wherein said bearing ring comprises an inner diameter which is constructed with a convex configuration taken in a cross section thereof at least at its middle portion.

7. A protective device according to claim 1 wherein said hollow protective member is formed with a corrugated configuration and wherein said support member is held in an outwardly curving section of said corrugated configuration.

* * * * *